(12) United States Patent
Hsieh et al.

(10) Patent No.: US 9,196,061 B2
(45) Date of Patent: Nov. 24, 2015

(54) SYSTEMS AND METHODS FOR PERFORMING TRUNCATION ARTIFACT CORRECTION

(71) Applicant: General Electric Company, Schenectady, NY (US)

(72) Inventors: Scott Hsieh, Palo Alto, CA (US); Norbert J. Pelc, Los Altos, CA (US); Brian Edward Nett, Madison, WI (US)

(73) Assignee: General Electric Company, Schenectady, NY (US)

( * ) Notice: Subject to any disclaimer, the term of this patent is extended or adjusted under 35 U.S.C. 154(b) by 320 days.

(21) Appl. No.: 13/667,734

(22) Filed: Nov. 2, 2012

(65) Prior Publication Data

US 2014/0126784 A1 May 8, 2014

(51) Int. Cl.
*G06K 9/00* (2006.01)
*G06T 11/00* (2006.01)

(52) U.S. Cl.
CPC ......... *G06T 11/005* (2013.01); *G06T 2211/432* (2013.01)

(58) Field of Classification Search
CPC ............ G06T 2211/424; G06T 2211/432; G06T 11/005; G06T 7/0012; G06T 2211/421; G06T 2207/10081
See application file for complete search history.

(56) References Cited

U.S. PATENT DOCUMENTS

| | | | |
|---|---|---|---|
| 6,246,742 B1 * | 6/2001 | Besson et al. | 378/8 |
| 6,810,102 B2 | 10/2004 | Hsieh et al. | |
| 6,856,666 B2 | 2/2005 | Lonn et al. | |
| 2005/0123215 A1 * | 6/2005 | Man | 382/275 |
| 2007/0253523 A1 * | 11/2007 | Zamyatin | 378/4 |
| 2008/0253635 A1 * | 10/2008 | Spies et al. | 382/131 |
| 2008/0273651 A1 * | 11/2008 | Boas | 378/4 |
| 2011/0150305 A1 * | 6/2011 | Zeng et al. | 382/131 |
| 2011/0164799 A1 * | 7/2011 | Miao et al. | 382/131 |
| 2011/0188723 A1 * | 8/2011 | Bruder et al. | 382/131 |

OTHER PUBLICATIONS

Zamyatin et al., Extension of the reconstruction field of view and truncation correction using sinogram decomposition, May 2007, Med. Phys. 34 (5), pp. 1593-1604.*

Hsieh et al., A novel reconstruction algorithm to extend the CT scan field-of-view, Sep. 2004, Med. Phys. 31 (9), pp. 2385-2391.*

(Continued)

*Primary Examiner* — Vu Le
*Assistant Examiner* — Guillermo Rivera-Martinez
(74) *Attorney, Agent, or Firm* — Dean D. Small; The Small Patent Law Group, LLC.

(57) ABSTRACT

A method for performing truncation artifact correction includes acquiring a projection dataset of a patient, the projection dataset including measured data and truncated data, generating an initial estimate of a boundary between the measured data and the truncated data, using the measured data to revise the initial estimate of the boundary, estimating the truncated data using the revised estimate of the boundary, and using the measured data and the estimated truncated data to generate an image of the patient.

17 Claims, 6 Drawing Sheets

(56) References Cited

OTHER PUBLICATIONS

Serlie et al., Classifying CT Image Data Into Material Fractions by a Scale and Rotation Invariant Edge Model, Dec. 2007, IEEE Transactions on Image Processing, vol. 16, No. 12, pp. 2891-2904.*

Bruder, et al., Efficient Extended Field of View (eFOV) Reconstruction Techniques for Multi-Slice Helical CT, Incorporated by Bruder Ref., 2008, Proc. of SPIE vol. 6913, pp. 69132E-1-10.*

* cited by examiner

SYSTEMS AND METHODS FOR PERFORMING TRUNCATION ARTIFACT CORRECTION

BACKGROUND OF THE INVENTION

The subject matter disclosed herein relates generally to imaging systems, and more particularly, to systems and methods for performing truncation artifact correction.

Computed Tomography (CT) imaging systems typically include an x-ray source and a detector. In operation, the x-rays are transmitted from the x-ray source, through a patient, and impinge upon the detector. The information from the detector, also referred to herein as the measured data, is then utilized to reconstruct a diagnostic image of the patient. However, under some scanning conditions, portions of the patient may extend beyond a region measured by the detector, e.g. when the patient is larger than the scan field of view (SFOV) of the detector. The SFOV is defined as the region for which the patient will be fully measured by the detector in every view. Additionally, the patient may not be properly aligned with the detector. Imaging patients that are larger than SFOV and/or patients that are improperly aligned with the detector may result in image artifacts.

More specifically, the CT imaging system is utilized to reconstruct cross-sectional images of the patient using a plurality of line integrals of the linear attenuation coefficients, e.g. the measured data. However, when the patient extends beyond the SFOV of the detector or the patient is improperly aligned with the detector, the line integrals outside the SFOV, also referred to herein as truncated data, are not known. Typically, the truncated data is therefore set to zero. Image reconstruction is then performed using the measured data and the truncated data. However, the truncated data may result in image artifacts, also referred to herein as truncation artifacts, in the reconstructed images. The truncation artifacts are typically visualized on the reconstructed images as a bright ring at the edge of the detector SFOV.

One known method of reducing truncation artifacts is to set the truncated data to a value other than zero in a technique known as padding. However, while padding may reduce the brightness of the ring at the edge of the detector SFOV, padding still does not provide a very accurate representation of the truncated data outside the detector SFOV.

BRIEF DESCRIPTION OF THE INVENTION

In one embodiment, a method is provided for performing truncation artifact correction. The method includes acquiring a projection dataset of a patient, the projection dataset including measured data and truncated data, generating an initial estimate of a boundary using the measured data and the truncated data, using the measured data to revise the initial estimate of the boundary, estimating the truncated data using the revised estimate of the boundary, and using the measured data and the estimated truncated data to generate an image of the patient.

In another embodiment, a non-transitory computer readable medium is provided. The non-transitory computer readable medium being programmed to instruct a computer to acquire a projection dataset of a patient, the projection dataset including measured data and truncated data, generate an initial estimate of a boundary using the measured data and the truncated data, use the measured data to revise the initial estimate of the boundary, estimate the truncated data using the revised estimate of the boundary, and use the measured data and the estimated truncated data to generate an image of the patient.

In a further embodiment, an imaging system is provided. The imaging system includes a detector and a computer coupled to the detector. The computer is configured to acquire a projection dataset of a patient, the projection dataset including measured data and truncated data, generate an initial estimate of a boundary using the measured data and the truncated data, use the measured data to revise the initial estimate of the boundary, estimate the truncated data using the revised estimate of the boundary, and use the measured data and the estimated truncated data to generate an image of the patient.

DETAILED DESCRIPTION OF THE INVENTION

Figure 1A:
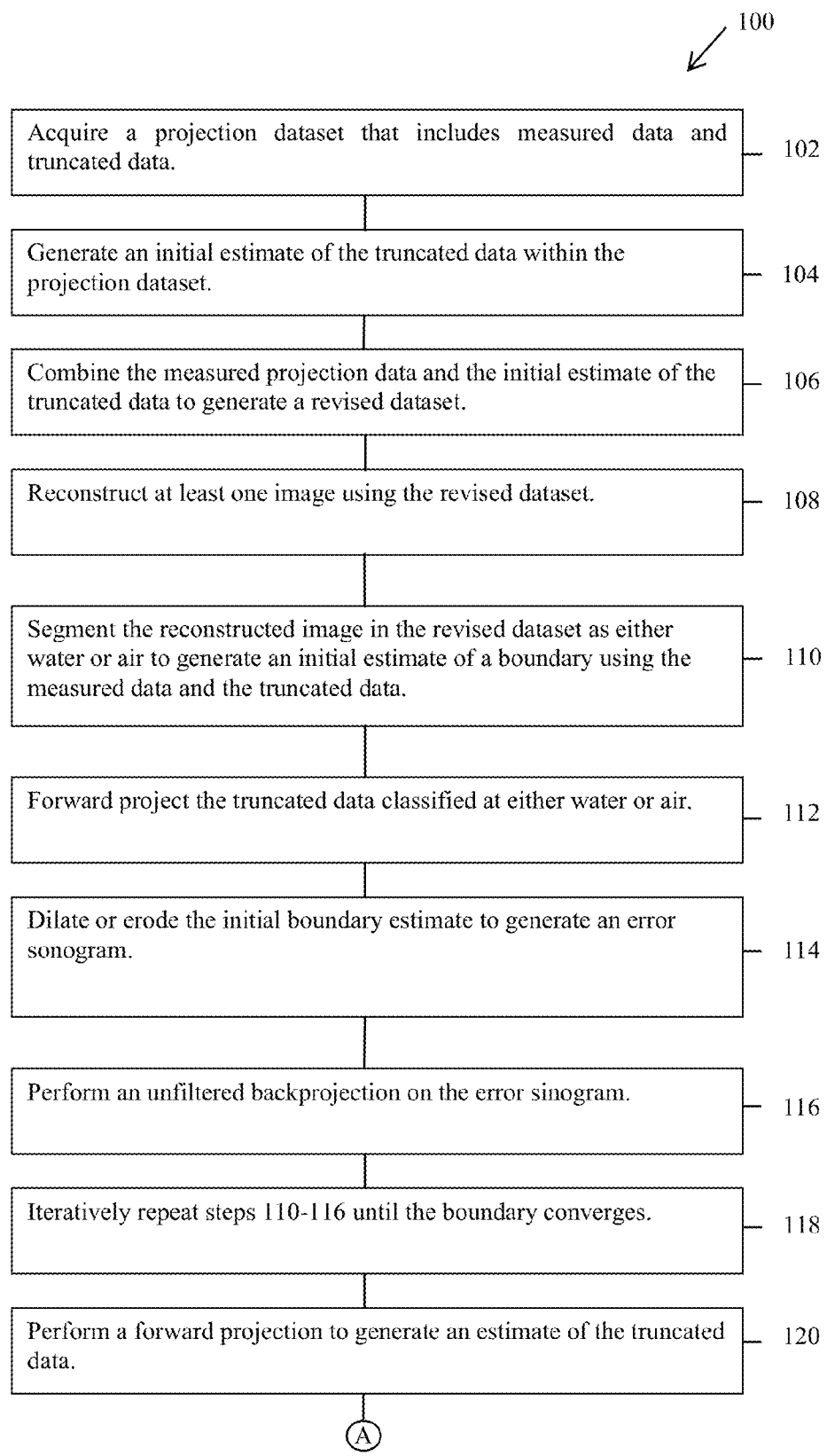
FIGS. 1A and 1B is a flowchart of an exemplary method for reconstructing an image of an object in accordance with various embodiments.

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

Described herein are various embodiments for performing truncation artifact correction using an iterative method or algorithm. In various embodiments, the method includes generating an initial estimate of a boundary that is between the measured data and the truncated data, e.g. a line between data that lies within a scan field of view (SFOV) and data that lies outside the SFOV. Thus, when the patient image is segmented, the area within the boundary and representing the patient is initially classified as water and the area outside the boundary is initially classified as air. Thus, the boundary defines where the patient goes from water to air. The iterative method then refines the reconstructed image by improving the estimate of the boundary. The mass outside the SFOV is first assumed to be water. At each iterative step in the method, the reconstruction outside the detector SFOV is thresholded into water and air. The measured x-ray beams are compared to the x-ray beams acquired during a forward projection of the image which has been thresholded outside the SFOV, and the changes are used to dilate or erode the estimate of the patient boundary. More specifically, after each thresholding iteration, the method performs a forward projection and subtracts the data with the measured data. A difference sinogram is then zeroed where no information is measured because of truncation artifacts. An unfiltered backprojection is then applied. Optionally, a filtered backprojection may also be utilized. A resulting difference image along the boundary may be thresholded. More specifically, where the boundary is above the threshold, the boundary is dilated. Where the boundary is below the threshold, the boundary is dilated. In various embodiments, a full difference sinogram may not be estimated. Instead, at points along the object boundary, the difference between the measured rays and the forward projected rays may be used to determine whether the boundary at the point should be dilated, eroded, or kept constant.

Figure 1B:
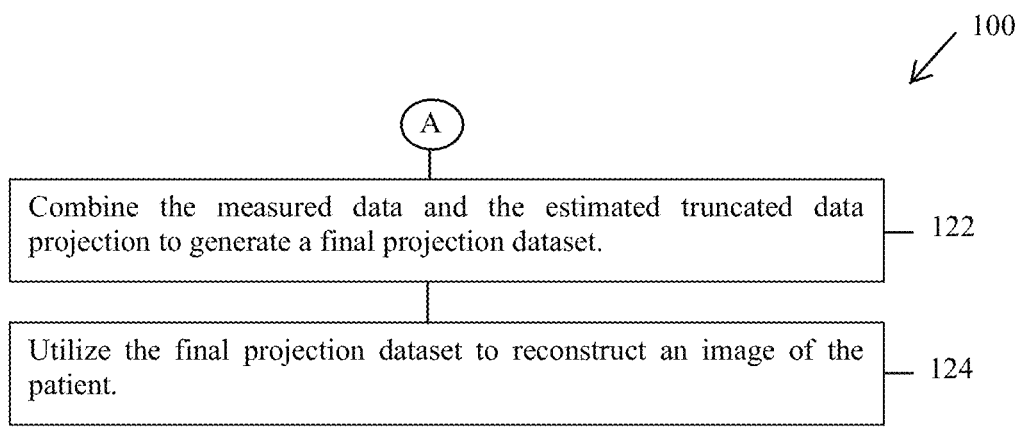

FIGS. 1A and 1B is a flowchart of an exemplary method 100 for performing truncation artifact correction. Although the method 100 is described in a medical setting using a Computed Tomography (CT) imaging system, it is contemplated that the benefits of the various embodiments described herein accrue to all CT imaging systems including industrial CT imaging systems such as, for example, a baggage scanning CT system typically used in a transportation center such as, for example, but not limited to, an airport or a rail station.

At 102, the method includes acquiring a set of projection data. In various embodiments, the projection data may be acquired using an exemplary imaging system, such as a CT imaging system 150 shown in FIG. 2. In various embodiments, the CT imaging system 150 includes an x-ray source 152 that projects a fan-shaped beam 154 which is collimated to lie within an X-Y plane of a Cartesian coordinate system and generally referred to as an "imaging plane". The fan-shaped beam 154 includes a plurality of x-ray beams 156 that define the SFOV 158 of a detector 160.

In operation, the x-ray beams 156 passes through an object being imaged, such as a patient 162. The x-ray beams 156, after being attenuated by the patient 162, impinge upon the detector 160. In various embodiments, the detector 160 includes a plurality of detector elements 164. The intensity of the attenuated x-ray beams 156 received at each of the detector elements 164 is dependent upon the attenuation of the x-ray beams 156 by the patient 162. More specifically, each detector element 164 produces an electrical signal that represents the intensity of an impinging x-ray beam 156 and hence allows estimation of the attenuation of the x-ray beam 156 as the x-ray beam 156 passes through the patient 162. In various embodiments, the detector 160 is a multislice detector 160 that includes a plurality of parallel detector rows (not shown) of detector elements 164 such that projection data corresponding to a plurality of slices may be acquired simultaneously during a scan.

A group of x-ray attenuation measurements, i.e., projection data 180, from the detector 160 at one gantry angle is referred to as a "view". A "scan" of the patient 162 may include a set of views made at different gantry angles, or view angles, during one revolution of the x-ray source 152 and the detector 160. The projection data 180 is then processed to generate an image that corresponds to a two dimensional slice taken through the patient 162.

Figure 2:
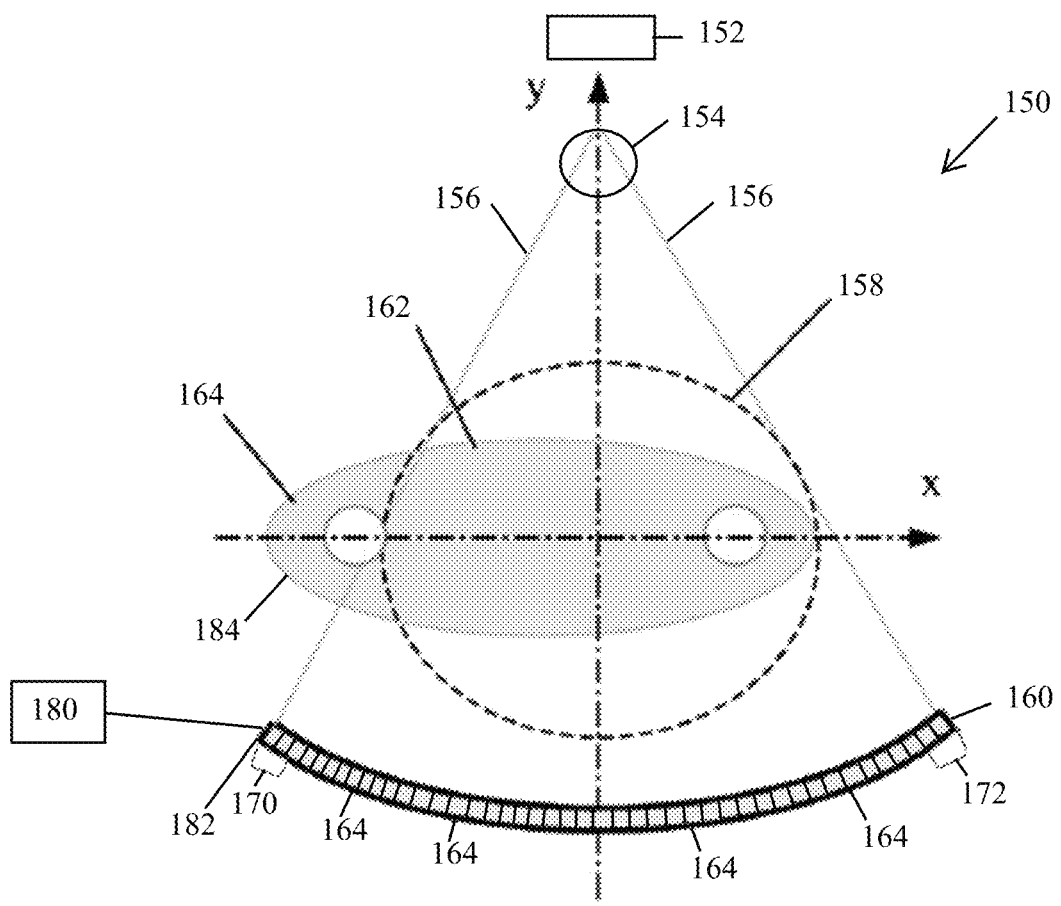
FIG. 2 is a simplified illustration of an exemplary imaging system formed in accordance with various embodiments.

In various embodiments, a portion 164 the patient 162 may extend beyond the SFOV 158 measured by detector 160 as shown in FIG. 2. More specifically, for the CT imaging system 150 to reconstruct images of the patient 162, the patient 162 should be located within the SFOV 158 of the detector 160. Traditional reconstruction methods require all nonzero line measurements to be known for accurate reconstruction to be possible. As a result, the failure to collect attenuation information concerning portions of the patient 162 extending beyond the detector SFOV 158 results in truncated views which result in truncation artifacts.

Figure 3:
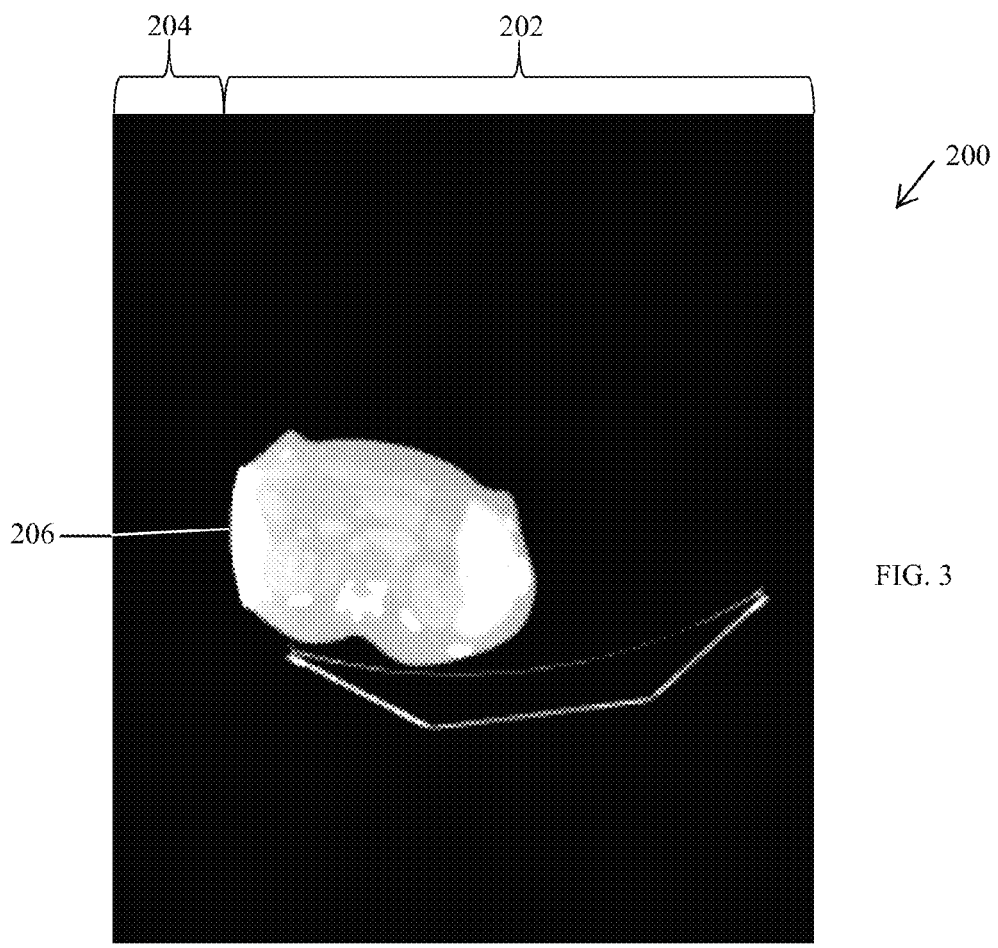
FIG. 3 is an example of truncation artifacts.

For example, FIG. 3 is an exemplary image 200 that is generated in accordance with various embodiments. As shown in FIG. 3, the image 200 is generated using non-truncated views 202 or images that are generated using the measured data, or non-truncated data. Measured data as used herein is data acquired by the detector 160 and that lies within the detector SFOV 158. Additionally, the image 200 includes truncated views 204 that cause truncation artifacts 206 which in the illustrated embodiment, appear as a bright white line near a left side of the image 200. Truncated views, or truncated data, as used herein refers to data that lie outside the detector SFOV 158, or views which contain some truncated data. Truncated views or data may also refer to data that is within the SFOV 158 but proximate to an edge of the detector 160, for example data acquired by the reference channels 170 and/or 172. Accordingly, and referring again to FIGS. 1A and 1B, at 102 a projection dataset that includes measured, or non-truncated data, and non-measured, or truncated data is acquired of the patient 162.

At 104, an initial estimate of the truncated data within the projection dataset 180 is estimated to identify the truncated data. In various embodiments, the truncated data may be estimated, or extrapolated, using for example, a padding method. In operation, the padding method identifies the last value measured in a specific detector channel and then assigns the last value to the data to the truncated data outside the same detector channel. For example, and referring again to FIG. 2, assume that the last value acquired from a detector element 182 is one. Accordingly, the value one is assigned to all truncated data that lies in the same detector row, so that the value in missing data is the same value as that of detector element 182. It should be realized that the detector 160 may include a plurality of detector rows. Accordingly, the padding value assigned to each truncated data point is based on the specific detector row of the detector 160. Accordingly, truncated data along different detector rows may be assigned the same value, or a different value.

In another embodiment, the truncated data may be modeled or estimated, on a view-by view basis, using a method referred to herein as water cylinder extrapolation. In operation, projections from neighboring channels are utilized to perform the water cylinder extrapolation. More specifically, because the human anatomy typically does not change quickly over a small distance, e.g. a few millimeters, the measurements along a boundary 184 (shown in FIG. 2) also typically do not vary significantly. Based on the boundary and the slope of the projection measurements obtained at the edge of the detector, a location and a size of a cylindrical water object that can be best fitted to the truncated projection is generated. In operation, a size and location of the water cylinder is therefore estimated based on the weighted average described above. The water cylinder information may then be utilized as an estimate for the truncated data. More specifically, the truncated data is modeled on a view-by-view basis as a cylinder made of water by calculating the slope and offset of the measured data at the boundary 182 of the truncation in order to uniquely determine the size and location of the imaginary water cylinder. The projections through the water cylinder may then be utilized to estimate the truncated data. In various embodiments, the water cylinder may be resealed or stretched to ensure that the total mass of the water cylinder is consistent throughout. In various other embodiments, a symmetric mirroring method or a polynomial extrapolation method may be utilized to estimate the truncated data. One method for using the water cylinder extrapolation technique is described in U.S. Pat. No. 6,856,666.

Referring again to FIGS. 1A and 1B, at 106 the measured data and the estimated truncated data are combined to generate a revised dataset.

Figure 4:
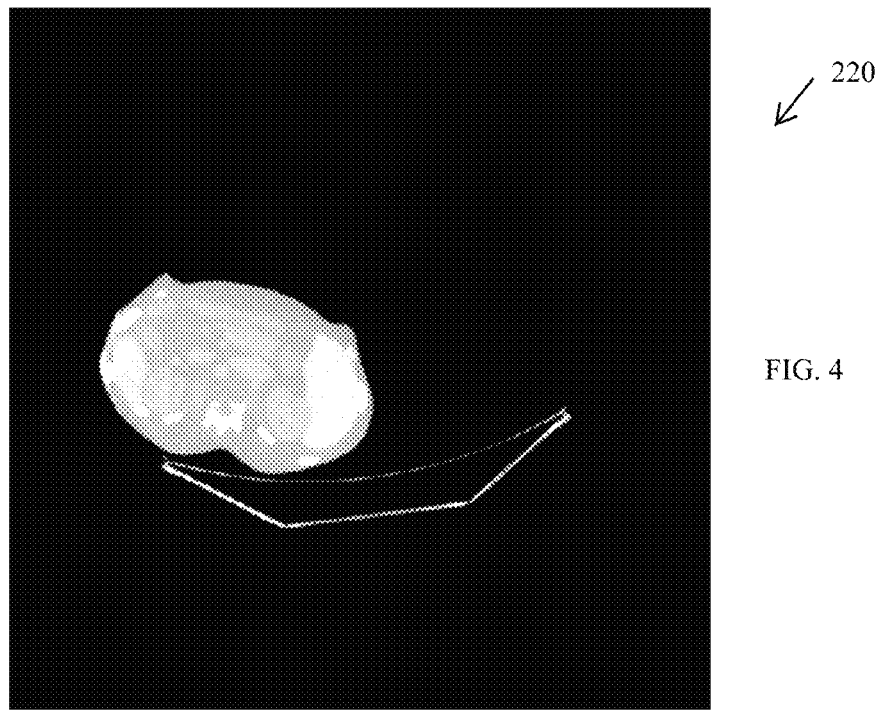
FIG. 4 is an example of truncation artifacts corrected by padding.

At 108, the revised dataset is reconstructed to generate at least one image of the patient 162. For example, FIG. 4 is an exemplary image 220 that may be reconstructed after implementing the water cylinder extrapolation technique described above. In various embodiments, the revised dataset may be reconstructed using a filtered backprojection technique. In operation, the filtered backprojection technique converts the attenuation measurements from the scan information into reconstructions of the object, typically in units called "CT numbers" or "Hounsfield units", which are used to control the brightness of a corresponding pixel on a display. Optionally, the revised dataset may be reconstructed using any known reconstruction method.

At 110, and in various embodiments, the reconstructed image generated at 108 is segmented as either water or air. More specifically, the Hounsfield units derived at 108 are utilized to classify or segment the truncated data as either water or air to provide an initial estimate of a location of the boundary 184. For example, assume that a single pixel representing a single truncated data point was previously estimated to have a Hounsfield unit value of X. Accordingly, in various embodiments, if X is greater than a predetermined value, the single truncated data point is classified as water. Moreover, if X is less than the predetermined value, the single truncated data point is classified as air. Accordingly, each of the truncated data points is classified as either water or air based on the Hounsfield value assigned at 108. In operation, classifying the truncated data as either water or air facilitates reducing errors that may result in shading artifacts, and may occur as a result of implementing, for example, the water cylinder extrapolation technique described above. In various other embodiments, the truncated data may be classified into more than two groups. For example, the truncated data may be classified as water, air, bone, metal, or iodine. In order to improve the quality of the boundary, postprocessing steps may be used after the initial segmentation. For example, on the segmented image, binary image closing or opening may be used to produce a cleaner boundary between air and water.

Referring again to FIGS. 1A and 1B, at 112 the measured data and the segmented truncated data, i.e the reconstruction, generated at 110 are forward projected to estimate the x-ray beams that were measured, e.g. the non-truncated data. In operation, forward projecting the projection data provides an estimate of what the measurements should be if the segmentation into water and air were correct. Because the segmentation outside the SFOV 158 is in general not correct, error exists between the forward projected measurements and the originally measured data. Within the SFOV 158, the water cylinder extrapolated result is generally good. However, as the data further outside the SFOV is extrapolated, the reconstructed image may exhibit increased quantities of artifacts.

Moreover, the water cylinder extrapolated image is consistent with the original measured data. Accordingly, when the reconstructed image is forward projected, a resulting sinogram, such as the sinogram 240 shown in FIG. 5, matches the measured data within the SFOV 158, but it is not consistent with our prior knowledge of what images should look like. For example, the reconstructed sinogram 240 may include negative values, streaks, and/or artifacts 241.

Figure 7:
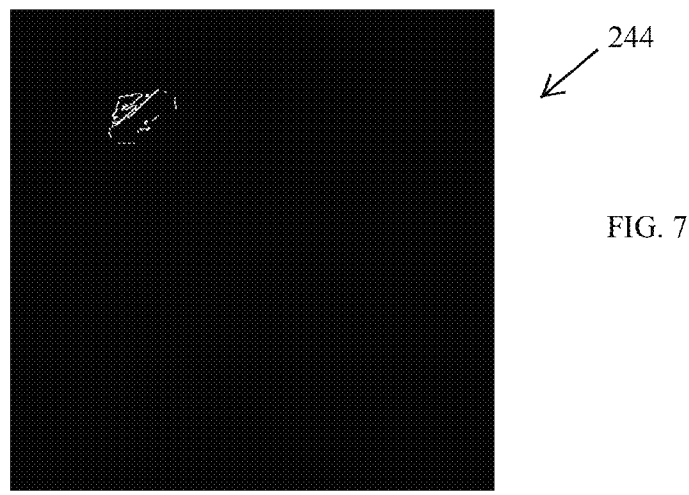
FIG. 7 is the error sinogram masked to show only values at the object boundary, which may be used to erode or dilate the boundary.

Accordingly, and referring again to FIGS. 1A and 1B, at 114 the initial boundary estimate is modified, as described in more detail below, and an error sinogram 244 is generated as shown in FIG. 7. In general, the sinogram 240 as described above, may be further refined or improved by iteratively thresholding or segmenting the truncated data into water and air as described above at 110. More specifically, when for example, the water cylinder extrapolation technique is utilized, the resultant reconstructed image or sinogram 240 accurately represents the information acquired during the scan within the SFOV 158. Accordingly, while various techniques, such as the water cylinder extrapolation technique, facilitate providing an improved image, further improvement may be desired to more accurately represent the truncated data.

In various embodiments, the initial boundary estimate may be modified or revised on a per data point basis, e.g. modifying each truncated data point, which is a measurement of a line integral. For example, as described above, the truncated data was initially estimated using the water cylinder extrapolation. A resultant image was then reconstructed as shown in FIG. 4 and segmented into water and air. Accordingly, at 114, the forward projected ray is compared to the measured ray. In one embodiment, if the forward projected ray is larger than the measured ray, there is too much mass along that ray. Accordingly, the boundary 184 is made smaller, or shrunk (eroded). If the forward projected ray is smaller than the measured ray, there is too little mass along that ray, the boundary 184 is expanded or dilated. Optionally, the boundary 184 is reduced or contracted and some of the water is reclassified as air. Repeating step 112 over all the rays yields an image that is more consistent with the measured data.

Figure 5:
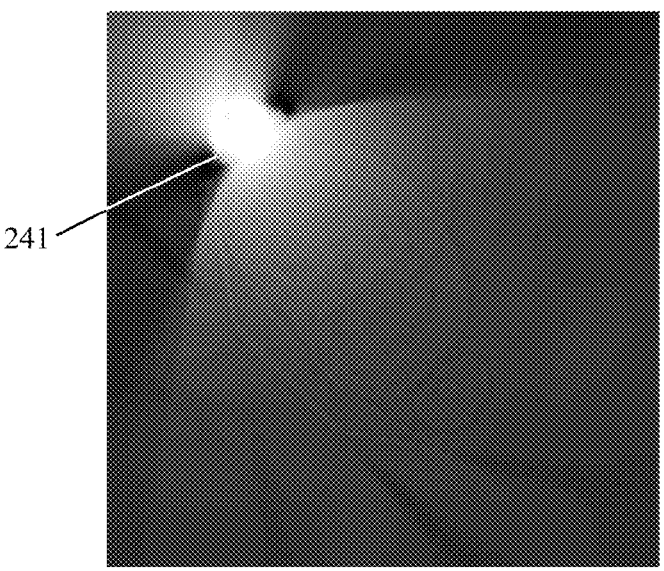
FIG. 5 is an unfiltered backprojection that may be generated using the method shown in FIGS. 1A and 1B to dilate or erode the object support.
Figure 6:
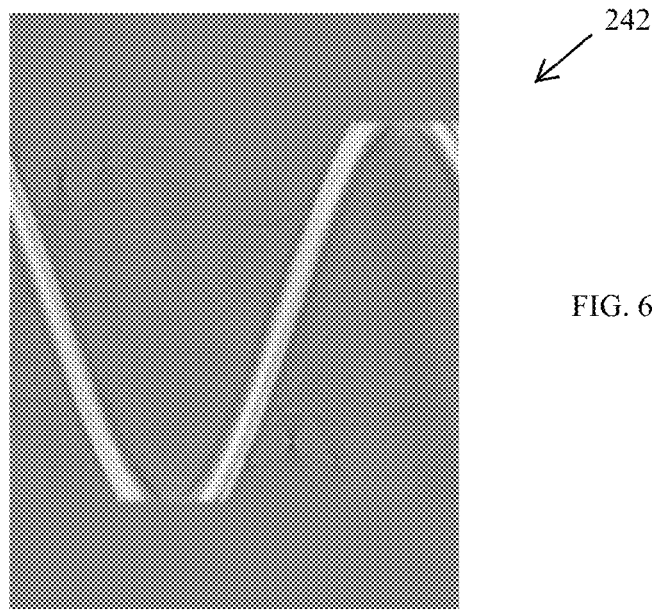
FIG. 6 is an error sinogram that may be generated using the method shown in FIGS. 1A and 1B.

In various embodiments, step 114 may be implemented in sinogram space. For example, FIG. 6 is an error sinogram 242 generated using the difference of the measured data and the forward projected data. FIG. 5, the label 240 identifies the unfiltered backprojection of the error sinogram 242. Accordingly, in various embodiments, the initial boundary estimate may be generated using the error or difference sinogram 242, which is segmented to show only the boundary as shown in FIG. 7. This image 244 may then be thresholded and used to guide the reclassification of boundary pixels from water into air or from air into water.

Referring again to FIGS. 1A and 1B, at 116 an unfiltered backprojection is performed using the error sinogram 244 to dilate or erode the initial boundary estimate. In operation, the unfiltered backprojection enables the method to identify a pixel in the image and determine the effects of the reconstruction using the measured rays compared to the forward projected rays. To reduce the computation time of the unfiltered backprojection, a subset of the data may be backprojected (for example, every other view, or every other ray within a view). A filter could be applied if desired.

At 118, steps 110-116 are iteratively repeated until changes or movement of the boundary 184 is less than a predetermined threshold. For example, if a final iteration does not appreciably expand or contract the boundary 184, the iterative process may be completed and the final boundary set at the location determined by the last location identified at step 116.

At 120, a forward projection is performed to generate the missing or truncated data. More specifically, as described above, a forward projection was utilized for the measured data. At 120, data acquired at 118 is forward projected to generate the missing or truncated data. In the exemplary embodiment, the truncated data is forward projected in the image domain to provide an estimate for the measurements that are outside the SFOV 158.

At 122, the measured data and the estimated data from the final forward projection at 120 are combined to generate a final or complete projection dataset. In various embodiments, a blending or smoothing operation may be performed on the final sinogram to facilitate reducing and/or eliminating discontinuities between the measured rays and the forward projected rays. At 124, the final projection dataset is utilized to reconstruct a final image of the patient 162 using any suitable method. In various embodiments, the method 100 may also include segmenting the image in an area outside the SFOV 158 to bone or iodine or iodine and water. For each bone, or iodine or metal location, the method may include estimating an expected point spread function at each location and then deconvolving the image by the point spread function to reduce artifacts caused by the bone or metal. This deconvolution could be regularized for stability, e.g. with a Wiener deconvolution.

The methods and algorithms described herein are used to perform truncation artifact correction. The methods and algorithms may be embodied as a set of instructions that are stored on a computer and implemented using, for example, a module 330, shown in FIG. 8, software, hardware, a combination thereof, and/or a tangible non-transitory computer readable medium. In one embodiment, a tangible non-transitory computer readable medium excludes signals.

Figure 8:
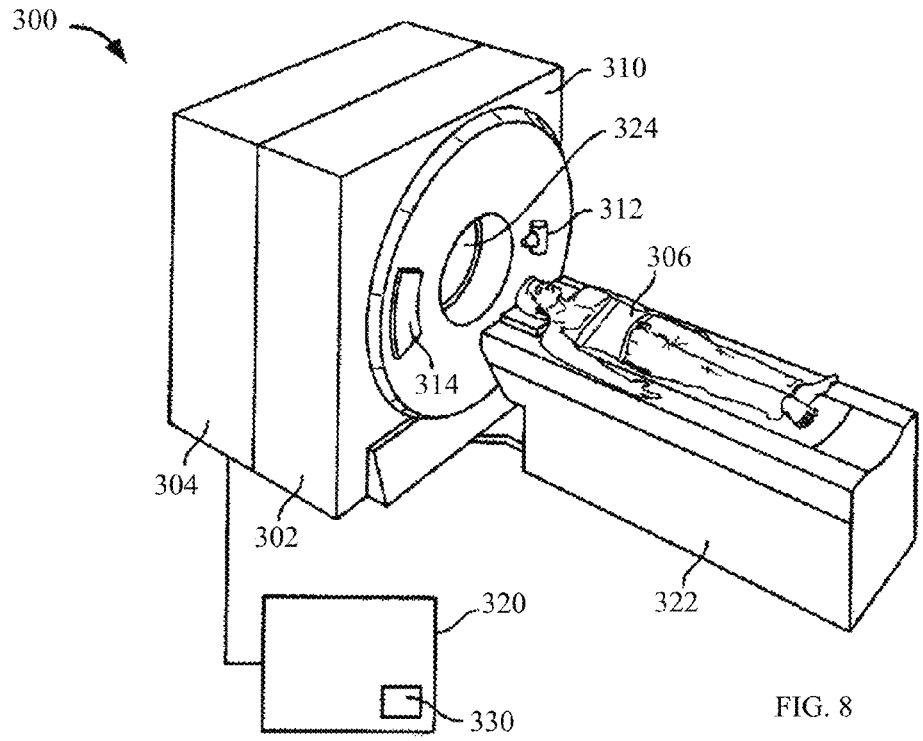
FIG. 8 is a pictorial view of an exemplary multi-modality imaging system formed in accordance with various embodiments.
Figure 9:
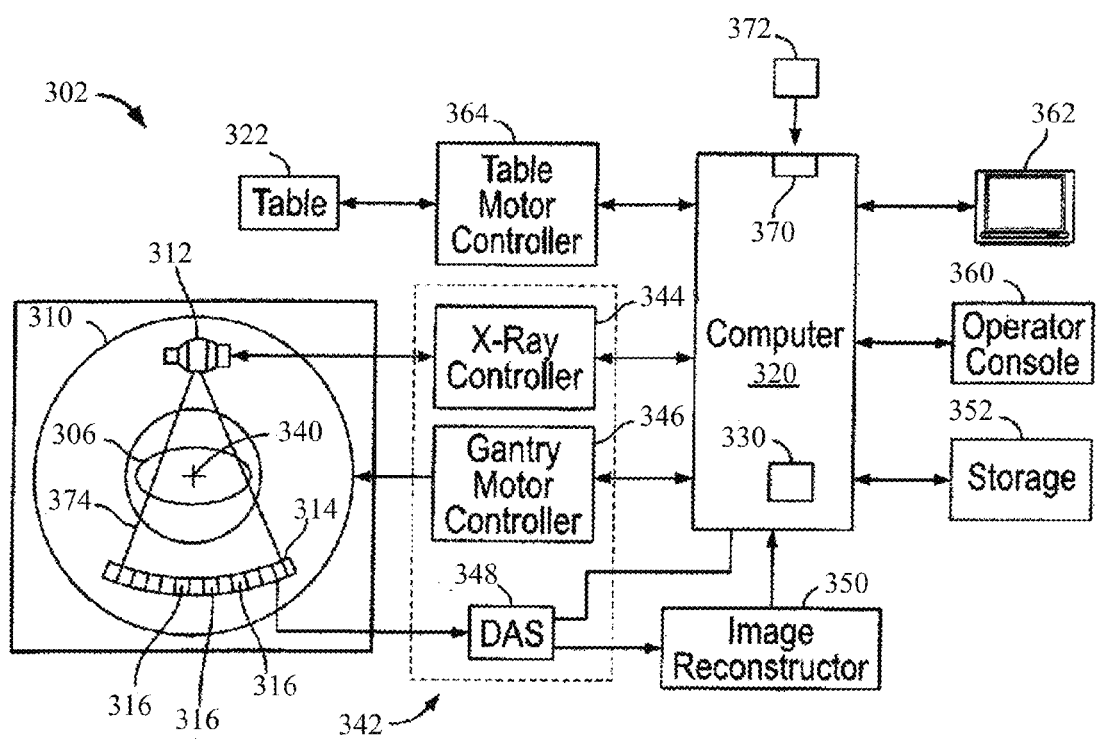
FIG. 9 is a block schematic diagram of the system illustrated in FIG. 8.

FIG. 8 is a pictorial view of an exemplary imaging system 300 that is formed in accordance with various embodiments. FIG. 9 is a block schematic diagram of a portion of the multi-modality imaging system 300 shown in FIG. 8. The imaging system may be embodied as a computed tomography (CT) imaging system, a positron emission tomography (PET) imaging system, a magnetic resonance imaging (MRI) system, an ultrasound imaging system, an x-ray imaging system, a single photon emission computed tomography (SPECT) imaging system, an interventional C-Arm tomography imaging system, a CT system for a dedicated purpose such as extremity or breast scanning, and combinations thereof, among others. In the exemplary embodiment, the method 100 is described with respect to a CT imaging system.

Although various embodiments are described in the context of an exemplary dual modality imaging system that includes a computed tomography (CT) imaging system and a positron emission tomography (PET) imaging system, it should be understood that other imaging systems capable of performing the functions described herein are contemplated as being used. Moreover, the various methods described herein may be implemented with a stand-alone CT imaging system.

The multi-modality imaging system 300 is illustrated, and includes a CT imaging system 302 and a PET imaging system 304. The imaging system 300 allows for multiple scans in different modalities to facilitate an increased diagnostic capability over single modality systems. In one embodiment, the exemplary multi-modality imaging system 300 is a CT/PET imaging system 300. Optionally, modalities other than CT and PET are employed with the imaging system 300. For example, the imaging system 300 may be a standalone CT imaging system, a standalone PET imaging system, a magnetic resonance imaging (MRI) system, an ultrasound imaging system, an x-ray imaging system, and/or a single photon emission computed tomography (SPECT) imaging system, interventional C-Arm tomography, CT systems for a dedicated purpose such as extremity or breast scanning, and combinations thereof, among others.

The CT imaging system 302 includes a gantry 310 that has an x-ray source 312 that projects a beam of x-rays toward a detector array 314 on the opposite side of the gantry 310. The detector array 314 includes a plurality of detector elements 316 that are arranged in rows and channels that together sense the projected x-rays that pass through an object, such as the subject 306. The imaging system 300 also includes a computer 320 that receives the projection data from the detector array 314 and processes the projection data to reconstruct an image of the subject 306. In operation, operator supplied commands and parameters are used by the computer 320 to provide control signals and information to reposition a motorized table 322. More specifically, the motorized table 322 is utilized to move the subject 306 into and out of the gantry 310. Particularly, the table 322 moves at least a portion of the subject 306 through a gantry opening 324 that extends through the gantry 310.

The imaging system 300 also includes a module 330 that is configured to implement various methods and algorithms described herein. The module 330 may be implemented as a piece of hardware that is installed in the computer 320. Optionally, the module 330 may be implemented as a set of instructions that are installed on the computer 320. The set of instructions may be stand alone programs, may be incorporated as subroutines in an operating system installed on the computer 320, may be functions in an installed software package on the computer 320, and the like. It should be understood that the various embodiments are not limited to the arrangements and instrumentality shown in the drawings.

As discussed above, the detector 314 includes a plurality of detector elements 316. Each detector element 316 produces an electrical signal, or output, that represents the intensity of an impinging x-ray beam and hence allows estimation of the attenuation of the beam as it passes through the subject 306. During a scan to acquire the x-ray projection data, the gantry 310 and the components mounted thereon rotate about a center of rotation 340. FIG. 9 shows only a single row of detector elements 316 (i.e., a detector row). However, the multislice detector array 314 includes a plurality of parallel detector rows of detector elements 316 such that projection data corresponding to a plurality of slices can be acquired simultaneously during a scan.

Rotation of the gantry 310 and the operation of the x-ray source 312 are governed by a control mechanism 342. The control mechanism 342 includes an x-ray controller 344 that provides power and timing signals to the x-ray source 312 and a gantry motor controller 346 that controls the rotational speed and position of the gantry 310. A data acquisition system (DAS) 348 in the control mechanism 342 samples analog data from detector elements 316 and converts the data to digital signals for subsequent processing. For example, the subsequent processing may include utilizing the module 330 to implement the various methods described herein. An image reconstructor 350 receives the sampled and digitized x-ray data from the DAS 348 and performs high-speed image reconstruction. The reconstructed images are input to the computer 320 that stores the image in a storage device 352. Optionally, the computer 320 may receive the sampled and digitized x-ray data from the DAS 348 and perform various methods described herein using the module 330. The computer 320 also receives commands and scanning parameters from an operator via a console 360 that has a keyboard. An associated visual display unit 362 allows the operator to observe the reconstructed image and other data from computer.

The operator supplied commands and parameters are used by the computer 320 to provide control signals and information to the DAS 348, the x-ray controller 344 and the gantry motor controller 346. In addition, the computer 320 operates a table motor controller 364 that controls the motorized table 322 to position the subject 306 in the gantry 310. Particularly, the table 322 moves at least a portion of the subject 306 through the gantry opening 324 as shown in FIG. 8.

Referring again to FIG. 9, in one embodiment, the computer 320 includes a device 370, for example, a floppy disk drive, CD-ROM drive, DVD drive, magnetic optical disk (MOD) device, or any other digital device including a network connecting device such as an Ethernet device for reading instructions and/or data from a computer-readable medium 372, such as a CD-ROM, a DVD or an other digital source such as a network or the Internet, as well as yet to be developed digital means. In another embodiment, the computer 320 executes instructions stored in firmware (not shown). The computer 320 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

In the exemplary embodiment, the x-ray source 312 and the detector array 314 are rotated with the gantry 310 within the imaging plane and around the subject 306 to be imaged such that the angle at which an x-ray beam 374 intersects the subject 306 constantly changes. A group of x-ray attenuation measurements, i.e., projection data, from the detector array 314 at one gantry angle is referred to as a "view". A "scan" of the subject 306 comprises a set of views made at different gantry angles, or view angles, during one revolution of the x-ray source 312 and the detector 314. In a CT scan, the projection data is processed to reconstruct an image that corresponds to a two dimensional slice taken through the subject 306.

Exemplary embodiments of a multi-modality imaging system are described above in detail. The multi-modality imaging system components illustrated are not limited to the specific embodiments described herein, but rather, components of each multi-modality imaging system may be utilized independently and separately from other components described herein. For example, the multi-modality imaging system components described above may also be used in combination with other imaging systems.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and/or the like. The storage device may also be other similar means for loading computer programs or other instructions into the computer or processor.

As used herein, the term "computer" may include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "computer". The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software, which may be a non-transitory computer readable medium. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments of the present invention in which data representing an image is generated, but a viewable image is not. Therefore, as used herein the term "image" broadly refers to both viewable images and data representing a viewable image. However, many embodiments generate, or are configured to generate, at least one viewable image.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for performing truncation artifact correction, said method comprising:
    acquiring a projection dataset of a patient, the projection dataset including measured data and truncated data;
    combining forward projected truncated data and the measured data to generate a revised dataset;
    reconstructing at least one image using the revised dataset;
    classifying the reconstruction into either water or air to generate generating an initial estimate of a location of a boundary between the patient and air using the measured data and the truncated data;
    using the measured data to revise the initial estimate of the location of the boundary;
    estimating the truncated data using the revised estimate of the location of the boundary; and
    using the measured data and the estimated truncated data to generate an image of the patient.

2. The method of claim 1, wherein generating the initial estimate of the location of the boundary includes generating the initial estimate of the location of the boundary using at least one of a water cylinder extrapolation technique, a symmetric mirroring technique or a polynomial extrapolation technique.

3. The method of claim 1, further comprising comparing the measured data to the forward projection of the classified image.

4. The method of claim 3, further comprising:
    dilating or eroding the initial boundary estimate to generate an error sinogram; and
    performing a backprojection on the error sinogram.

5. The method of claim 1, further comprising iteratively estimating the truncated data using the revised estimate of the location of the boundary until the boundary converges.

6. The method of claim 1, wherein using the measured data further comprises:
    forward projecting the revised estimate to generate a revised set of truncated data;
    combining the forward projected truncated data and the measured data to generate a final set of projection data; and
    utilizing the final set of projection data to generate the image of the patient.

7. The method of claim 1, wherein using the measured data further comprises:
    segmenting the image in an area outside a scanned field of view to bone, iodine, or metal and water;
    for each bone, iodine or metal location, estimating an expected point spread function of bone at each location; and
    deconvolving the point spread function to reduce artifacts.

8. A non-transitory computer readable medium being programmed to instruct a computer to:
    acquire a projection dataset of a patient, the projection dataset including measured data and truncated data;
    combine forward projected truncated data and the measured data to generate a revised dataset;
    reconstruct at least one image using the revised dataset;
    classify the reconstruction into either water or air to generate an initial estimate of a location of a boundary between the patient and air using the measured data and the truncated data;
    use the measured data to revise the initial estimate of the location of the boundary;
    estimate the truncated data using the revised estimate of the location of the boundary; and
    use the measured data and the estimated truncated data to generate an image of the patient.

9. The non-transitory computer readable medium of claim 8, wherein the computer is further instructed to generate the initial estimate of the location of the boundary using a water cylinder extrapolation.

10. The non-transitory computer readable medium of claim 8, wherein the computer is further instructed to:
    generate an error sinogram using the measured data and a forward projection of the reconstruction, and
    using the error sinogram to dilate or erode the initial boundary estimate.

11. The non-transitory computer readable medium of claim 8, wherein the computer is further instructed to iteratively estimate the location of the boundary using the measured data until the boundary converges.

12. The non-transitory computer readable medium of claim 8, wherein the computer is further instructed to:
    perform a forward projection using the revised estimate of the location of the boundary to generate a revised estimate of the truncated data;
    combine the forward projected truncated data and the measured data to generate a final set of projection data; and
    utilize the final set of projection data to generate the image of the patient.

13. The non-transitory computer readable medium of claim 8, wherein the computer is further instructed to:
    segment the image in an area outside a scanned field of view to bone, iodine, or metal and water;
    for each bone, iodine or metal location, estimate an expected point spread function of bone, iodine, or metal at each location; and
    deconvolve the point spread function to reduce artifacts.

14. An imaging system comprising:
    a detector;
    an x-ray source configured to transmit a plurality of x-rays through a patient to the detector;

a computer coupled to the detector, the computer configured to:

acquire a projection dataset of a patient, the projection dataset including measured data and truncated data;

combine forward projected truncated data and the measured data to generate a revised dataset;

reconstruct at least one image using the revised dataset;

classify the reconstruction into either water or air to generate an initial estimate of a location of a boundary between the patient and air using the measured data and the truncated data;

use the measured data to revise the initial estimate of the location of the boundary;

estimate the truncated data using the revised estimate of the location of the boundary; and use the measured data and the estimated truncated data to generate an image of the patient.

15. The imaging system of claim 14, wherein the computer is further configured to generate the initial estimate of the location of the boundary using a water cylinder extrapolation.

16. The imaging system of claim 14, wherein the computer is further configured to:

generate an error sinogram using the measured data and forward projection of the reconstruction, and use the error sinogram to use it to dilate or erode the initial boundary estimate.

17. The imaging system of claim 14, wherein the computer is further configured to iteratively estimate the truncated data using the revised estimate of the location of the boundary until the boundary converges.

* * * * *